(12) United States Patent
Yeh et al.

(10) Patent No.: US 7,858,735 B2
(45) Date of Patent: Dec. 28, 2010

(54) METHOD AND APPARATUS FOR ELASTOMER FINISHING

(75) Inventors: Richard C. Yeh, Bellaire, TX (US); Yu Feng Wang, Houston, TX (US); Jean-Paul Swoboda, Grandcamp (FR); Oscar K. Broussard, III, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 70 days.

(21) Appl. No.: 12/475,034

(22) Filed: May 29, 2009

(65) Prior Publication Data

US 2010/0305301 A1 Dec. 2, 2010

(51) Int. Cl.
*C08F 6/00* (2006.01)
*C08J 3/00* (2006.01)

(52) U.S. Cl. .................. 528/481; 523/334; 523/335; 524/495

(58) Field of Classification Search .......... 523/334.335; 524/495; 528/481
See application file for complete search history.

(56) References Cited

U.S. PATENT DOCUMENTS

| | | |
|---|---|---|
| 2,371,722 A | 3/1945 | Wanderer |
| 3,240,746 A | 3/1966 | Davis |
| 3,591,928 A | 7/1971 | Nara |
| 3,834,440 A | 9/1974 | McCracken |
| 4,185,057 A | 1/1980 | Loetterle et al. |
| 4,304,054 A | 12/1981 | Nauck |
| 4,776,269 A | 10/1988 | Coggins et al. |
| 5,041,249 A | 8/1991 | Yeh |
| 5,042,169 A | 8/1991 | Vero |
| 5,070,624 A | 12/1991 | Vero et al. |
| 5,085,815 A | 2/1992 | Yeh et al. |
| 5,708,132 A | 1/1998 | Grimm |
| 5,729,911 A | 3/1998 | Kelleher et al. |
| 6,517,335 B1 | 2/2003 | Long et al. |

FOREIGN PATENT DOCUMENTS

| | | |
|---|---|---|
| DE | 1 579 106 | 1/1970 |
| FR | 2224269 | 10/1974 |
| GB | 1 590 532 | 6/1982 |

*Primary Examiner*—Terressa M Boykin
(74) *Attorney, Agent, or Firm*—Nancy T. Krawczyk; Jennifer A. Schmidt

(57) ABSTRACT

In the production of elastomers the product obtained from the polymerization process is often in the form of a slurry. Described herein are an apparatus and a process for "finishing" the elastomer, i.e., dewatering and drying the elastomer. The process comprises the steps of obtaining a slurry comprising water and elastomer; passing the slurry through a first dewatering device to produce a wet elastomer crumb, wherein the first dewatering device comprises two dewatering extruders in parallel; passing the wet elastomer crumb through a second dewatering device; and then passing the wet elastomer crumb through a drying device to produce a dried elastomer crumb.

18 Claims, 1 Drawing Sheet

METHOD AND APPARATUS FOR ELASTOMER FINISHING

FIELD OF THE INVENTION

This disclosure relates to a finishing process for an elastomer. More particularly, this disclosure relates to a method and apparatus for dewatering and drying a water-slurried elastomer.

BACKGROUND OF THE INVENTION

In the production of elastomeric polymers, such as isobutylene-based elastomers, the product obtained from the polymerization process is often in the form of an aqueous slurry. The water-slurried elastomer is then "finished" to obtain the final elastomer product by dewatering the elastomer, drying the elastomer, and cooling the dried elastomer so that it may be baled/packaged.

U.S. Pat. No. 5,729,911 discloses a process for continuous dewatering/drying of EP(D)M. The process comprises continuously charging wet EP(D)M crumb into a single screw extruder having particular structural features and conveying the wet crumb through the length of the extruder under conditions sufficient to expel water, increase the pressure across the die plate of the extruder and heat the crumb. The dried crumb thus extruded is characterized in that it contains less than 1% water.

However, processes for finishing EP(D)M elastomers may not work for other types of elastomers. For example, some elastomers, such as isobutylene-based elastomers, are temperature sensitive and are not able to be subjected to extreme temperatures common in EP(D)M dewatering and drying processes without degradation. Additionally, different elastomers have different slurry chemistries and different viscoelasticity which affect the ability to dewater and dry the elastomer. For example, a slurry of butyl elastomer, particularly halobutyl elastomer, has a higher pH than a slurry of EP(D)M. This higher pH makes the butyl elastomer crumb more slippery and thus harder to dewater and dry than EP(D)M crumb. Further elastomer characteristics, such as Mooney viscosity, molecular weight distribution, and the presence or absence of long chain branching, may also affect the ability to de-water and dry the elastomer.

A typical finishing line, such as described in U.S. Pat. No. 5,041,249, consists of a dewatering extruder, an optional intermediate drying extruder, and a dryer. Such finishing lines are limited in the amount of elastomer they can finish per hour. One bottleneck is in the dewatering step. As the dewatering extruder receives the slurry, it removes water imbibed in the crumbs through mechanical squeezing of the crumb in the extruder barrel and some minor water flashing at the die. The dewatering extruder removes a great amount of water from the elastomer crumb and is susceptible to contaminants in the slurry water or on the crumb surface (surfactant, etc.) that can induce slipping in the barrel and/or cause waterlogging wherein the crumb floats and can no longer be conveyed.

Another limitation on the capacity of finishing lines is the amount of water in the elastomer crumb fed to the drying extruder. In the drying extruder the elastomer crumbs are heated up by shear forces and water is flashed off at the drying extruder's die exit. If the moisture level of the elastomer crumbs fed to the drying extruder is too high the crumbs will not be adequately dried. However, if the feed moisture level is too low then the final elastomer crumb product will still be wet due to insufficient water flash at the drying extruder's die. Thus, the narrow operating window in which the moisture level of the elastomer crumb entering the drying extruder must be within acts as another bottleneck to increasing the capacity of finishing lines.

Therefore, there still remains a need for improved processes for dewatering and drying elastomers, including temperature sensitive elastomers, such as isobutylene-based elastomers. In particular, there is a need for a process and apparatus that is able to finish large capacities of isobutylene-based elastomers in a single finishing line.

SUMMARY OF THE INVENTION

In one aspect, the method comprises the steps of obtaining a slurry comprising an elastomer and 30.0 to 70.0 wt % water based on the weight of the slurry; passing the slurry through a first dewatering device comprising at least two dewatering extruders in parallel to produce a wet elastomer crumb, wherein the wet elastomer crumb comprises 3.0 to 20.0 wt % water based on the weight of the wet elastomer crumb; passing the wet elastomer crumb through a second dewatering device to produce a partially dried elastomer crumb, wherein the partially dried elastomer crumb comprises 2.0 to 10.0 wt % water based on the weight of the partially dried elastomer crumb; and passing the partially dried elastomer crumb through a drying device to produce a dried elastomer crumb, wherein the dried elastomer crumb comprises less than or equal to 1.0 wt % water based on the weight of the dried elastomer crumb.

In one embodiment, and in combination the above disclosed aspect, the method further comprises the step of passing the slurry through at least one dewatering screen prior to passing the slurry through the first dewatering device.

In another aspect, the method comprises obtaining a slurry comprising an elastomer and 70.0 to 99.0 wt % water based on the weight of the slurry; splitting the slurry into at least two streams; passing each stream through a separate dewatering screen to obtain streams of partially dewatered slurry, wherein the partially dewatered slurry comprises 30.0 to 70.0 wt % water based on the weight of the slurry; passing each stream of partially dewatered slurry through separate dewatering extruders, wherein the dewatering extruders are operated in parallel, to produce streams of wet elastomer crumb each comprising 5.0 to 18.0 wt % water based on the weight of the wet elastomer crumb; combining the streams of wet elastomer crumb; passing the combined stream of wet elastomer crumb through a dewatering device to form a partially dried elastomer crumb comprising 2.0 to 10.0 wt % water based on the weight of the partially dried elastomer crumb; and passing the partially dried elastomer crumb through a drying device operating at a temperature of 200° C. or less to produce a dried elastomer crumb comprising less than or equal to 1.0 wt % water based on the weight of the dried elastomer crumb.

The above disclosed methods and embodiments may be useful for dewatering and drying a temperature sensitive elastomer. In some embodiments, the temperature sensitive elastomer is selected from styrene-butadiene rubber, solution styrene-butadiene rubber, isoprene-butadiene rubber, polyisoprene rubber, isobutylene-based elastomers, halogenated isobutylene-based elastomers, and mixtures thereof.

In one embodiment, and in combination with any of the above disclosed aspects or embodiments, the method is capable of producing at least 6 tons of dried elastomer crumb per hour. In other embodiments, the method is capable of producing at least 8 tons, or at least 10 tons, or at least 12 tons, of elastomer crumb per hour.

In one embodiment, and in combination with any of the above disclosed aspects or embodiments, the drying device comprises an extruder having at least two screws.

In another embodiment, and in combination with any of the above disclosed aspects or embodiments, an inert gas in injected into the compression zone of the drying device at a pressure in excess of the pressure in the drying device.

These and other features, aspects, and advantages of the present disclosure will become better understood with regard to the following description and appended claims.

DETAILED DESCRIPTION OF THE INVENTION

Figure 1:
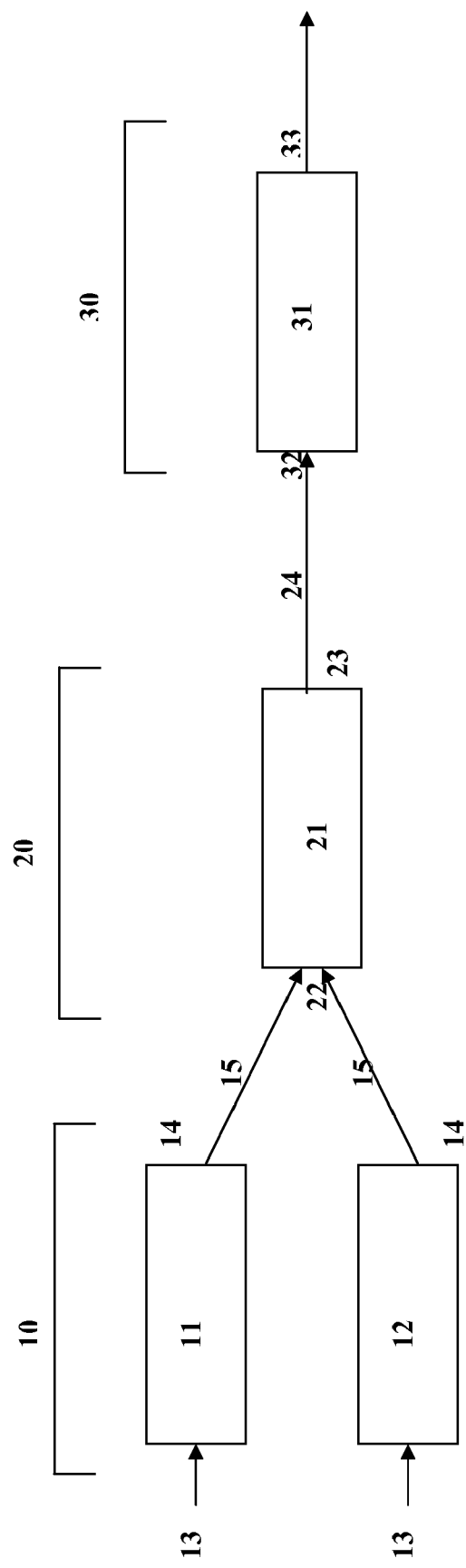
FIG. 1 is an illustrative schematic of an embodiment of an apparatus for dewatering and drying an elastomer.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "elastomer," as used herein, refers to any polymer or combination of polymers consistent with the ASTM D1566 definition of "a material that is capable of recovering from large deformations, and can be, or already is, modified to a state in which it is essentially insoluble (but can swell) in boiling solvent." As used herein, the term "elastomer" may be used interchangeably with the term "rubber." Preferred elastomers have a melting point that cannot be measured by DSC or if it can be measured by DSC is less than 40° C., or preferably less than 20° C., or less than 0° C. Preferred elastomers have a Tg of −50° C. or less as measured by DSC.

As used herein, the term "isobutylene based elastomer," refers to an elastomer or polymer comprising at least 70 mol % repeat units from isobutylene. These polymers can be described as random copolymers of a $C_4$ isomonoolefin derived unit, such as an isobutylene derived unit, and at least one other polymerizable unit. The isobutylene-based elastomer may or may not be halogenated.

As used herein, the term "slurry" refers to a mixture of elastomer and water, plus any residual hydrocarbon volatiles that may remain from the polymerization process.

In the production of elastomers the product obtained from the polymerization process is often in the form of a slurry. Described herein are an apparatus and a process for "finishing" the elastomer, i.e., dewatering and drying the elastomer. For example, in one embodiment, the process comprises the steps of obtaining a slurry, passing the slurry through a first dewatering device to produce a wet elastomer crumb, passing the wet elastomer crumb through a second dewatering device, and then passing the wet elastomer crumb through a drying device to produce a dried elastomer crumb.

The process and apparatus described herein are useful for finishing temperature sensitive elastomers. Temperature sensitive elastomers are those elastomers which undergo degradation when exposed to extreme temperatures during the finishing process. High temperatures may cause degradation, scorching or ignition of the elastomer, alteration of the chemical structure of the stabilizers and other additives, or fouling of downstream equipment. Temperature sensitive elastomers may change color, form gels or cross-linking, and break down when exposed to temperatures greater than 230° C. The finishing process described herein may be particularly useful for finishing temperature sensitive elastomers selected from styrene-butadiene rubber, solution styrene-butadiene rubber, isoprene-butadiene rubber, polyisoprene rubber, isobutylene-based elastomers, halogenated isobutylene-based elastomers, and mixtures thereof.

In preferred embodiments, the finishing process described herein may be used to finish isobutylene-based elastomers, including halogenated versions of these elastomers. Non-limiting examples isobutylene-based elastomers include $C_4$ monoolefin based rubbers, butyl rubber (isoprene-isobutylene rubber, "IIR"), branched ("star-branched") butyl rubber, star-branched polyisobutylene rubber, halogenated butyl rubber (such as, bromobutyl or chlorobutyl), random copolymers of isobutylene and para-methylstyrene, any halogenated versions of these elastomers, and mixtures thereof.

In one embodiment, the isobutylene-based elastomer comprises random copolymers of isobutylene and para-methylstyrene containing from 0.5 to 20.0 mol % para-methylstyrene wherein up to 60.0 mol % of the methyl substituent groups present on the benzyl ring contain a bromine or chlorine atom, as well as acid or ester functionalized versions thereof. In certain embodiments, the random copolymers have a substantially homogeneous compositional distribution such that at least 95.0% by weight of the polymer has a para-alkylstyrene content within 10.0% of the average para-alkylstyrene content of the polymer. Exemplary polymers are characterized by a narrow molecular weight distribution (Mw/Mn) of less than 5.0, alternatively less than 2.5, an exemplary viscosity average molecular weight in the range of 200,000 up to 2,000,000 and an exemplary number average molecular weight in the range of 25,000 to 750,000 as determined by gel permeation chromatography.

In another embodiment, the isobutylene-based elastomer may be a brominated poly(isobutylene-co-p-methylstyrene) ("BIMSM"). BIMSM polymers generally contain from 0.1 to 5.0% mole of bromomethylstyrene groups relative to the total amount of monomer derived units in the copolymer. In one embodiment, the random polymer is a copolymer of $C_4$ to $C_7$ isoolefin derived units (or isomonoolefin), para-methylstyrene derived units, and para-(halomethylstyrene) derived units, wherein the para-(halomethylstyrene) units are present in the polymer in the range of 0.4 to 3.0 mol % based on the total number of para-methylstyrene, and wherein the para-methylstyrene derived units are present in the range of 3.0 to 15.0 wt %, based on the total weight of the polymer. In a preferred embodiment, the para-(halomethylstyrene) is para-(bromomethylstyrene).

In another embodiment, the finishing process described herein may be used to finish elastomers containing nanocomposites. Nanocomposites are polymer systems containing inorganic particles with at least one dimension in the nanometer range. A common type of inorganic particle used in nanocomposites are phyllosilicates, an inorganic substance from the general class of so called "nano-clays" or "clays." In some embodiments, the nanocomposite comprises an isobutylene-based elastomer and a swellable inorganic clay materials, such as natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like.

The finishing process and apparatus described herein allow for greater flexibility in running a finishing line. Having at least two dewatering extruders in parallel in the first dewatering device allows for the finishing line to finish greater capacities of elastomer but also allows for the flexibility of finishing smaller amounts of elastomer when needed. Additionally, the second dewatering device is capable of accepting the varying capacities from the first dewatering extruder. The first dewatering device and the second dewatering device also allow for the drying device to dry elastomer crumbs having a wider range of feed mill moisture.

The finishing processes and apparatus described herein allow for high capacity elastomer finishing and are capable of dewatering and drying at least 6 tons of elastomer crumb per hour. In some embodiments, the process and apparatus are capable of dewatering and drying at least 8 tons of elastomer crumb per hour, or at least 10 tons of elastomer crumb per hour, or at least 12 tons of elastomer crumb per hour, or in some embodiments at least 15 tons of elastomer crumb per hour.

The process and apparatus described herein may allow for an improvement in the finishing ratio compared to conventional finishing processes. The finishing ratio of a finishing line is the ratio of tons of elastomer finished per hour to the number of extruders required. An improved finishing ratio may allow the finishing process described herein to have a smaller footprint and be more energy efficient than what would be needed to finish the same amount of elastomer using conventional finishing processes. In some embodiments the inventive finishing process achieves a finishing ratio of at least 2.75, or at least 3, or at least 3.2.

The process and apparatus described herein allow for finishing the elastomer in less than or equal to 10 minutes. That is, the time from when the slurry enters the first dewatering device to the time the dried elastomer crumb exits the drying device is less than or equal to 10 minutes, more preferably less than or equal to 5 minutes. In some embodiments, the time from when the slurry enters the first dewatering device to the time the dried elastomer crumb exits the drying device is less than or equal to 3 minutes, or less than or equal to 2 minutes, or less than or equal to 1 minute.

The finishing process and apparatus will now be more particularly described with reference to FIG. 1. The finishing process and apparatus generally comprises passing a slurry through a first dewatering device ("FDWD") 10 to produce a wet elastomer crumb, passing the wet elastomer crumb through a second dewatering device ("SDWD") 20 to produce a partially dried elastomer crumb, and then passing the partially dried elastomer crumb through a drying device 30 to produce a dried elastomer crumb.

In some embodiments, the slurry containing 1.0 to 30.0 wt % elastomer, or 2.0 to 20.0 wt % elastomer, or 5.0 to 15.0 wt % elastomer, based on the total weight of the slurry, is passed through one or more dewatering screens (not shown in FIG. 1) prior to introducing the slurry to the FDWD. In one embodiment, there are two dewatering screens in parallel. In some embodiments, the dewatering screen is a vibrating screen. After passing through the dewatering screen, the slurry may comprise 30.0 to 70.0 wt % water, or 40.0 to 60.0 wt % water, or 45.0 to 55.0 wt % water, or 47.0 to 53.0 wt % water, based on the total weight of the slurry. After the slurried elastomer crumbs are discharged from the dewatering screen they are fed to the FDWD 10 for additional water removal.

The FDWD 10 comprises one or more extruders, preferably at least two extruders in parallel. The FDWD typically dewaters the slurry through mechanical squeezing of the elastomer in the extruder barrel. In some embodiments, there may also be a minor amount of water flashing at the die. Water flashing is the instantaneous release of water that occurs upon exit of the elastomer from the extruder at an elevated temperature and elevated (above atmospheric) pressure.

Examples of extruders that may be used in the FDWD include the Expeller manufactured by V.D. Anderson or French Oil Mill Machinery; or Slurry Dewatering Units or Dewatering Extruders manufactured by Welding Engineers, Inc., National Feed Screw Machine, or by Japan Steel Works, Ltd.

The FDWD preferably comprises two or more extruders in parallel. In some embodiments, the FDWD 10 comprises two dewatering extruders ("DWEs") (11 and 12) in a parallel configuration. The slurry enters the DWEs at the extruder input 13, passes through the DWEs wherein the slurry is partially dewatered to produce a wet elastomer crumb exiting the DWEs at the exit die 14. The mill moisture (i.e., water content of the wet elastomer crumb) at the exit of the FDWD may be in the range of 3.0 to 20.0 wt % water, or in the range of 5.0 to 18.0 wt % water, or in the range of 10.0 to 17.0 wt % water, or in the range of 12.0 to 16.0 wt % water.

The discharged crumbs from the FDWD generally have a size less than or equal to 3" (length)×1.5" (diameter), or less than or equal to 2" (length)×1" (diameter).

In one embodiment, the "expelled" water from the FDWD and decanted water from the dewatering screens, if used, is routed to a fines recovery system (not shown). In the fines recovery system, elastomer fines in the water may be recovered for future reprocessing. The water from the fines recovery system may then be pumped to a return water tank or purged.

The wet elastomer crumbs that are expelled from the FDWD 10 are then fed into a SDWD 20. In some embodiments, the wet elastomer crumbs discharged from the FDWD are conveyed to the SDWD via airvey or by an inclined vibrating conveyor 15.

In one embodiment, the SDWD 20 may be a single screw extruder. In some embodiments, the SDWD has an extruder barrel diameter of at least 8 inches (20.32 cm), or at least 10 inches (25.4 cm), or at least 12 inches (30.48 cm). Examples of useful SDWDs include Expanders manufactured by V.D. Anderson or French Oil Mill Machinery; dewatering extruders manufactured by Japan Steel Works, Ltd., Welding Engineers, Inc, or National Feed Screw Machinery; or Volatile Control Units manufactured by Japan Steel Works, Ltd., Welding Engineers, Inc, or National Feed Screw Machinery.

In some embodiments, small amounts of an inert gas are injected into the SDWD. Preferably, the gas is injected into a compression zone of the SDWD at a pressure greater than the pressure in the SDWD. A compression zone is an area within the SDWD in which the pressure is in excess of atmospheric pressure. The gas mixes with the elastomer within the SDWD without any venting of the gas and as the mixture moves from the compression zone to the die which is at atmospheric pressure, the mixture expands causing explosive drying and water flashing. In one embodiment, the SDWD may have multiple ports allowing simultaneous gaseous injection at different points along the length of the SDWD. For example, the SDWD may have two different gases injected into the SDWD at different locations along the length of the SDWD at the same time. The inert gas may comprise nitrogen, argon, helium, neon, $CO_2$, or mixtures thereof. In one embodiment, at least nitrogen is injected into the SDWD. The amount of gas injected into the SDWD may be less than 5.0 wt % of the elastomer throughput, or less than 3.0 wt %, or less than 2.0 wt %.

In one embodiment, the mill moisture, i.e., water content, of the elastomer crumb at the SDWD's die discharge 23, is in the range of 2.0 to 10.0 wt % water, or in the range of 3.0 to 8.0 wt % water, or in the range of 4.0 to 7.0 wt % water. In another embodiment, the mill moisture at the SDWD's die discharge 23 is in the range of 5.0 to 9.0% water.

As the partially dried elastomer crumbs exit the SDWD they are transported to the drying device 30. In some embodiments, the elastomer crumbs that are discharged downward through the SDWD's die holes are cut by a mechanical cutter. In one embodiment, the elastomer crumbs fall from the SDWD onto an inclined vibrating conveyor 24 and are fed into the drying device 30.

In preferred embodiments, the drying device comprises a drying extruder. In one embodiment, the drying device has two extruder screws. In some embodiments the drying device's extruder barrel has a diameter of at least 4 inches (10.16 cm), or at least 6 inches (15.24 cm), preferably at least 8 inches (20.32 cm). Examples of drying extruders include, but are not limited to, the Expander, manufactured by V.D. Anderson; the Volatile Control Unit and the Dual Worm Dryer manufactured by Welding Engineers, Inc. or by National Feed Screw Machine; or counter-rotating or co-rotating twin screw extruders manufactured by Japan Steel Works.

In the drying device the partially dried elastomer crumb is heated and compressed by mechanical shear by the screw(s) of the extruder. In some embodiments, additional heat may be supplied to the extruder via a heated extruder jacket. Upon exiting from the drying device's die 33, superheated water vaporizes, flashes, and creates passages (pores) for the water vapor to escape and evaporate, thus drying the elastomer crumbs. In some embodiments, the temperature of the dried elastomer crumb at the exit the drying device die 33 is in the range of 160 to 200° C., or in the range of 170 to 190° C., or in the range of 180 to 190° C. In some embodiments, the drying device has an operating pressure in the range of 1000 to 1500 psi (6.89 to 10.34 MPa), or in the range of 1100 to 1300 psi (7.58 to 8.96 MPa), or operates at a pressure of about 1200 psi (8.27 MPa).

In some embodiments, small amounts of an inert gas are injected into the drying device. Preferably, the gas is injected into the compression zone of the drying device at a pressure greater than the pressure in the drying device. The compression zone of the drying device is the area within which the pressure is in excess of atmospheric pressure. The gas mixes with the elastomer within the drying device without any venting of the gas and as the mixture moves from the compression zone to the die which is at atmospheric pressure, the mixture expands causing explosive drying and water flashing. In one embodiment, the drying device may have multiple ports allowing simultaneous gaseous injection at different points along the length of the drying device. For example, the drying device may have two different gases injected into the drying device at different locations along the length of the drying device at the same time. The inert gas may comprise nitrogen, argon, helium, neon, $CO_2$, or mixtures thereof. In one embodiment, at least nitrogen is injected into the drying device. The amount of gas injected into the drying device may be less than 5.0 wt % of the elastomer throughput, or less than 3.0 wt %, or less than 2.0 wt %. The injection of an inert gas into the drying device is described in more detail in GB 1 590 532, incorporated herein by reference.

In some embodiments, after the elastomer crumbs exit the drying device they are cut by a mechanical cutter. In some embodiments, the crumbs discharged from the drying device are further dried on a fluidized bed conveyor ("FBC") (not shown in FIG. 1) for further drying. Heated air from the FBC may aid in evaporating any remaining surface moisture.

The process and apparatus described herein produce dried elastomer crumbs containing less than 1.0 wt % water. In some embodiments, the dried elastomer crumb comprise less than 0.5 wt % water, or less than 0.3 wt % water, or less than 0.10 wt % water, or less than 0.05 wt % water.

This process may be particularly advantageous for finishing halogenated isobutylene-based elastomers, as halobutyl is particularly thermosensitive. In an embodiment, at no point in the finishing process is the elastomer crumb exposed to a temperature greater than 230° C. If the temperature is too high the elastomer may degrade (e.g., in the case of halobutyl, begin to dehalogenate) giving the elastomer product a discolored or mottled/gel appearance. In preferred embodiments, the elastomer crumb is not exposed to temperatures greater than 215° C., or greater than 210° C., or greater than 205° C., or greater than 200° C., or greater than 195° C., while in the FDWD, SDWD, or the drying device. In some embodiments, the elastomer crumb is not exposed to temperatures greater than 230° C., or greater than 215° C., or greater than 210° C., or greater than 205° C., or greater than 200° C., or greater than 195° C., while in any combination of the FDWD, SDWD, or the drying device, or in the entire finishing process. In order to avoid degradation of the elastomer crumb it is important that the elastomer crumb is not exposed to temperatures greater than 230° C. while in the drying device, or in some embodiments temperatures greater than 200° C. while in the drying device.

The temperature the elastomer crumb is exposed to may differ from the FDWD to the SDWD to the drying device. For example, the temperature the elastomer crumb is exposed to may be less in the FDWD and in the SDWD than in the drying device. In some embodiments, the elastomer crumb may not be exposed to a temperature greater than 230° C., or greater than 200° C., or greater than 180° C., or greater than 150° C., or greater than 100° C. while in the FDWD and in the SDWD; and the elastomer crumb may not be exposed to a temperature greater than 230° C., or greater than 215° C., or greater than 205° C., or greater than 200° C. while in the drying device. In one embodiment, the elastomer crumb is not exposed to a temperature greater than 230° C. while in the FDWD and in the SDWD, and is not exposed to a temperature greater than 200° C. while in the drying device. In another embodiment, the elastomer crumb is not exposed to a temperature greater than 150° C. while in the FDWD and in the SDWD, and is not exposed to a temperature greater than 200° C. while in the drying device.

In one embodiment, a method is provided for drying at least 6 tons of elastomer crumb per hour, where the method comprises the steps of: (a) obtaining a slurry comprising elastomer and 30.0 to 70.0 wt % water based on the weight of the slurry; (b) passing the slurry through a first dewatering device comprising at least two dewatering extruders in parallel to produce a wet elastomer crumb comprising 3.0 to 20.0 wt % water based on the weight of the wet elastomer crumb; and (c) passing the wet elastomer crumb through a drying device to produce a dried elastomer crumb comprising less than or equal to 1.0 wt % water based on the weight of the dried elastomer crumb. In some embodiments, the slurry is passed through a dewatering screen prior to step (b). In some embodiments, the slurry is split into two streams and each stream is passed through a separate dewatering screens prior to step (b).

In another embodiment, a method is provided for drying at least 6 tons of elastomer crumb per hour, where the method comprises the steps of: (a) obtaining a slurry comprising elastomer and 30.0 to 70.0 wt % water based on the weight of the slurry; (b) passing the slurry through a first dewatering device comprising at least two dewatering extruders in parallel to produce a wet elastomer crumb comprising 3.0 to 20.0 wt % water based on the weight of the wet elastomer crumb; (c) passing the wet elastomer crumb through a second dewatering device comprising a dewatering extruder to produce a partially dried elastomer crumb comprising 2.0 to 10.0 wt % of water based on the weight of the wet elastomer crumb; and (d) passing the partially dried elastomer crumb through a drying device to produce a dried elastomer crumb comprising less than or equal to 1.0 wt % water based on the weight of the dried elastomer crumb.

In yet another embodiment, a method is provided for drying at least 6 tons of elastomer crumb per hour, where the method comprises the steps of: (a) obtaining a slurry comprising elastomer and 70.0 to 99.0 wt % water based on the weight of the slurry; (b) passing the slurry through at least one dewatering screen to produce a partially dewatered slurry, wherein the partially dewatered slurry comprises 30.0 to 70.0 wt % water based on the weight of the slurry; (c) passing the partially dewatered slurry through a first dewatering device comprising at least two dewatering extruders in parallel to produce a wet elastomer crumb comprising 3.0 to 20.0 wt % water based on the weight of the wet elastomer crumb; (d) passing the wet elastomer crumb through a second dewatering device comprising a dewatering extruder to produce a partially dried elastomer crumb comprising 2.0 to 10.0 wt % of water based on the weight of the wet elastomer crumb; and (e) passing the partially dried elastomer crumb through a drying device to produce a dried elastomer crumb comprising less than or equal to 1.0 wt % water based on the weight of the dried elastomer crumb.

In one embodiment, a slurry comprising elastomer and 70.0 to 99.0 wt % water, or 80.0 to 98.0 wt % water, or 85.0 to 95.0 wt % water, is split into at least two streams and each stream is introduced to a separate dewatering screen to form two streams of partially dewatered slurry. Each partially dewatered slurry stream each comprising 30.0 to 70.0 wt % water, or 40.0 to 60.0 wt % water, or 45.0 to 55.0 wt % water, or 47.0 to 53.0 wt % water, is then introduced to a separate dewatering extruder, wherein the dewatering extruders are operated in parallel. The partially dewatered slurry streams pass through the dewatering extruders forming two streams of wet elastomer crumb, each comprising 3.0 to 20.0 wt % water, or 5.0 to 18.0 wt % water, or 10.0 to 17.0 wt % water, or 12.0 to 16.0 wt % water. The streams of wet elastomer crumb are then combined and then introduced to a SDWD. The SDWD is preferably a single screw extruder. The wet elastomer crumb passes through the SDWD to form a partially dried elastomer crumb comprising 2.0 to 10.0 wt % water, or 3.0 to 9.0 wt % water, or 5.0 to 9.0 wt % water. The partially dried elastomer crumb is then introduced to a drying device wherein the elastomer crumb is further dried to form a dried elastomer crumb. The drying device is preferably an extruder having at least two screws. The dried elastomer crumb comprises less than 1.0 wt %, or less than 0.7 wt % water, or less than 0.5 wt % water, or less than 0.3 wt % water.

In one embodiment, the process comprises introducing a slurry comprising temperature sensitive elastomer and 40.0 to 60.0 wt % water based on the weight of the slurry to a FDWD comprising two dewatering extruders in a parallel configuration. The slurry passes through the FDWD where at least a portion of the water is removed resulting in a wet elastomer crumb comprising 12.0 to 16.0 wt % water. The wet elastomer crumb is then introduced to a SDWD where a single screw extruder further dewaters and dries the elastomer crumb through shearing actions of the screw elements against the breaker bolts along the extruder barrel (viscous heating) as well as against the die restriction. The elastomer crumb is then discharged through the SDWD die where water in the crumbs flashes off causing the elastomer temperature to drop to a temperature in the range of 80 to 90° C. The wet elastomer crumb, now comprising 5.0 to 9.0 wt % water is then introduced to a drying device, which preferably has at least 2 extruder screws. The drying device heats up the elastomer crumbs by screw action pressing the wet rubber against the die. The drying device die temperature must be high enough to cause violent explosion at the die to evaporate the remaining water from rubber crumbs, but not so high as to cause degradation of the elastomer. The drying device die temperature may be in the range of 180 to 190° C. The dried elastomer crumb exits the drying device having a water content of less than 0.5 wt %.

In another embodiment, the finishing process is capable of finishing at least 8 tons of a temperature sensitive elastomer per hour in a three step extrusion process. The extrusion process starts from a slurry tank that feeds a slurry comprising 10.0 wt % of a temperature sensitive elastomer crumb in water, based on the weight of the slurry, to two dewatering screens in parallel to separate free water from crumbs. The slurries, now comprising 40.0 to 50.0 wt % water, are discharged from each dewatering screen into two dewatering extruders in parallel. The dewatering extruders remove additional water and produce a wet elastomer crumb comprising 10.0 to 17.0 wt % water. The wet elastomer crumb is fed from the two parallel dewatering extruders into the second extruder through a common vibrating conveyor. The second extruder further dewaters and dries the wet elastomer crumb to a point where the crumb comprises 2.0 to 10.0 wt % water. The elastomer crumbs discharged from the second extruder are cut by a mechanical cutter and then fall into an inclined vibrating conveyor and fed into a drying device. The drying device has at least two extruder screws, and provides energy for the last water flash through mechanical shear. The dried elastomer crumbs discharged from the drying device contain less than 1.0 wt % surface water. The crumbs are then further dried in a fluidized bed conveyor to a point where they contain less than 0.3 wt %.

In yet another embodiment, a method is provided for drying at least 6 tons of a temperature sensitive elastomer crumb per hour, where the method comprises the steps of: (a) obtaining a slurry comprising temperature sensitive elastomer and 70.0 to 99.0 wt % water based on the weight of the slurry; (b) passing the slurry through at least one dewatering screen to produce a partially dewatered slurry, wherein the partially dewatered slurry comprises 30.0 to 70.0 wt % water based on the weight of the slurry; (c) passing the partially dewatered slurry through a first dewatering device comprising at least two dewatering extruders in parallel to produce a wet elastomer crumb comprising 3.0 to 20.0 wt % water based on the weight of the wet elastomer crumb; (d) passing the wet elastomer crumb through a second dewatering device comprising a dewatering extruder to produce a partially dried elastomer crumb comprising 2.0 to 10.0 wt % of water based on the weight of the wet elastomer crumb, wherein 5.0 wt % or less, based on the elastomer throughput, of an inert gas is injected into the SDWD at a pressure greater than the pressure in the SDWD; and (e) passing the partially dried elastomer crumb through a drying device to produce a dried elastomer crumb comprising less than or equal to 1.0 wt % water based on the weight of the dried elastomer crumb, wherein the partially dried elastomer crumb is not exposed to a temperature greater than 200° C. while in the drying device.

In a further embodiment, a method is provided for drying at least 6 tons of temperature sensitive elastomer crumb per hour, where the method comprises the steps of: (a) obtaining a slurry comprising temperature sensitive elastomer and 30.0 to 70.0 wt % water based on the weight of the slurry; (b) passing the slurry through a first dewatering device comprising at least two dewatering extruders in parallel to produce a wet elastomer crumb comprising 3.0 to 20.0 wt % water based on the weight of the wet elastomer crumb; (c) passing the wet elastomer crumb through a second dewatering device comprising a dewatering extruder to produce a partially dried elastomer crumb comprising 2.0 to 10.0 wt % of water based on the weight of the wet elastomer crumb; and (d) passing the partially dried elastomer crumb through a drying device to produce a dried elastomer crumb comprising less than or equal to 1.0 wt % water based on the weight of the dried elastomer crumb wherein 5.0 wt % or less, based on the elastomer throughput, of an inert gas is injected into the compression zone of drying device at a pressure greater than the pressure in the drying device. Preferably, the inert gas comprises nitrogen.

In still another embodiment, a method is provided for drying at least 6 tons of a temperature sensitive elastomer. The method comprises (a) obtaining a slurry comprising a temperature sensitive elastomer and 30.0 to 70.0 wt % water based on the weight of the slurry; (b) splitting the slurry into at least two streams; (c) passing the streams through a first dewatering device to produce streams of wet elastomer crumb each comprising 3.0 to 20.0 wt % water based on the weight of the wet elastomer crumb, wherein the first dewatering device comprises at least two dewatering extruders in parallel and wherein each stream of slurry is passed through a separate dewatering extruder; (d) combining the streams of wet elastomer crumb; (e) passing the combined stream of wet elastomer crumb through a SDWD to produce a partially dried elastomer crumb comprising 2.0 to 10.0 wt % water based on the weight of the partially dried elastomer crumb, wherein 5.0 wt % or less, based on the elastomer throughput, of an inert gas is injected into the SDWD at a pressure greater than the pressure in the SDWD; and (f) passing the partially dried elastomer crumb through a drying device to produce a dried elastomer crumb comprising less than or equal to 1.0 wt % of water, wherein 5.0 wt % or less, based on the elastomer throughput, of an inert gas is injected into the compression zone of drying device at a pressure greater than the pressure in the drying device. Preferably, the inert gas comprises nitrogen.

A further embodiment provides an apparatus capable of drying at least 8 tons of an isobutylene-based elastomer hour. The apparatus comprises a first dewatering device which comprises at least two dewatering extruders in parallel; a second dewatering device comprising a dewatering extruder, wherein the inlet of the second dewatering device is connected to the outlet of the first dewatering device by a pneumatic transport; and a drying device having a diameter of greater than or equal to 6 inches, wherein the outlet of the second dewatering device is connected to the inlet of the drying device by a pneumatic transport.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A method for drying an elastomer comprising the steps of:
    a. obtaining a slurry comprising an elastomer and 30.0 to 70.0 wt % water based on the weight of the slurry;
    b. passing the slurry through a first dewatering device comprising at least two dewatering extruders in parallel to produce a wet elastomer crumb, wherein the wet elastomer crumb comprises 3.0 to 20.0 wt % water based on the weight of the wet elastomer crumb;
    c. passing the wet elastomer crumb through a second dewatering device to produce a partially dried elastomer crumb, wherein the partially dried elastomer crumb comprises 2.0 to 10.0 wt % water based on the weight of the partially dried elastomer crumb; and
    d. passing the partially dried elastomer crumb through a drying device to produce a dried elastomer crumb, wherein the dried elastomer crumb comprises less than or equal to 1.0 wt % water based on the weight of the dried elastomer crumb;
    wherein the method is capable of producing at least 6 tons of dried elastomer crumb per hour.

2. The method of claim 1, wherein the elastomer is a temperature sensitive elastomer.

3. The method of claim 1, wherein the elastomer is a temperature sensitive elastomer selected from styrene-butadiene rubber, solution styrene-butadiene rubber, isoprene-butadiene rubber, polyisoprene rubber, isobutylene-based elastomers, halogenated isobutylene-based elastomers, and mixtures thereof.

4. The method of claim 1, wherein the elastomer comprises an isobutylene-based elastomer.

5. The method of claim 1, wherein the method further comprises the step of passing the slurry through at least one dewatering screen prior to passing the slurry through the first dewatering device.

6. The method of claim 1, wherein the drying device comprises an extruder having at least two screws.

7. The method of claim 1, wherein the dried elastomer crumb comprises less than or equal to 0.5 wt % water based on the weight of the dried elastomer.

8. The method of claim 1, wherein the method is capable of producing at least 8 tons of dried elastomer crumb per hour.

9. The method of claim 1, wherein the drying device comprises a compression zone and an inert gas is injected into the compression zone of the drying device.

10. The method of claim 1, wherein the elastomer crumb is not exposed to temperatures greater than 230° C. while in the first dewatering device, second dewatering device, or drying device.

11. A method for drying a temperature sensitive elastomer comprising the steps of:
   a. obtaining a slurry comprising a temperature sensitive elastomer and 70.0 to 99.0 wt % water based on the weight of the slurry;
   b. splitting the slurry into at least two streams;
   c. passing each stream through separate dewatering screens to obtain streams of partially dewatered slurry, wherein the partially dewatered slurry comprises 30.0 to 70.0 wt % water based on the weight of the slurry;
   d. passing the streams through a first dewatering device to produce streams of wet elastomer crumb, wherein the wet elastomer crumb comprises 5.0 to 18.0 wt % water based on the weight of the wet elastomer crumb, wherein the first dewatering device comprises at least two dewatering extruders in parallel and wherein each stream is passed through a separate dewatering extruder;
   e. combining the streams of wet elastomer crumb;
   f. passing the combined stream of wet elastomer crumb through a second dewatering device to form a partially dried elastomer crumb comprising 2.0 to 10.0 wt % water based on the weight of the partially dried elastomer crumb; and
   g. passing the partially dried elastomer crumb through a drying device at a temperature of 200° C. or less to produce a dried elastomer crumb, wherein the dried elastomer crumb comprises less than or equal to 1.0 wt % water based on the weight of the dried elastomer crumb;
   wherein the method is capable of producing at least 8 tons of dried elastomer crumb per hour.

12. The method of claim 11, wherein the temperature sensitive elastomer is selected from styrene-butadiene rubber, solution styrene-butadiene rubber, isoprene-butadiene rubber, polyisoprene rubber, isobutylene-based elastomers, halogenated isobutylene-based elastomers, and mixtures thereof.

13. The method of claim 11, wherein the temperature sensitive elastomer comprises an isobutylene-based elastomer.

14. The method of claim 13, wherein the isobutylene-based elastomer is a halogenated elastomer.

15. The method of claim 11, wherein the dried elastomer crumb comprises less than or equal to 0.5 wt % water based on the weight of the dried elastomer.

16. The method of claim 11, wherein the method is capable of producing at least 12 tons of dried elastomer crumb per hour.

17. The method of claim 11, wherein the drying device comprises a compression zone and an inert gas is injected into the compression zone of the drying device.

18. The method of claim 11, wherein the elastomer crumb is not exposed to temperatures greater than 150° C. while in the first dewatering device or the second dewatering device.

* * * * *